United States Patent
Seekins et al.

(10) Patent No.: US 6,175,733 B1
(45) Date of Patent: Jan. 16, 2001

(54) METHOD FOR RECOVERING COMMUNICATION SERVICE

(75) Inventors: David S. Seekins; Saumil Parikh, both of Sunrise; Charles R. Barker, Jr., Plantation, all of FL (US)

(73) Assignee: Motorola, Inc., Schaumburg, IL (US)

(*) Notice: Under 35 U.S.C. 154(b), the term of this patent shall be extended for 0 days.

(21) Appl. No.: 09/263,335

(22) Filed: Mar. 5, 1999

(51) Int. Cl.[7] .................................................. H04B 7/26
(52) U.S. Cl. ...................... 455/434; 455/515; 455/161.3; 455/185.1
(58) Field of Search .................... 455/432, 434, 455/435, 437, 515, 161.1, 161.2, 161.3, 185.1, 186.1, 166.1, 166.2

(56) References Cited

U.S. PATENT DOCUMENTS

| | | | |
|---|---|---|---|
| 5,262,769 | * 11/1993 | Holmes | 455/186.1 |
| 5,457,816 | * 10/1995 | Koyama | 455/186.1 |
| 5,497,508 | * 3/1996 | George | 455/161.2 |
| 5,499,386 | 3/1996 | Karlson | 455/437 |
| 5,517,677 | * 5/1996 | Moon | 455/161.1 |
| 5,711,001 | * 1/1998 | Bussan et al. | 455/161.3 |
| 5,751,772 | * 5/1998 | Mannette et al. | 455/161.2 |
| 5,937,351 | * 8/1999 | Seekins et al. | 455/434 |

* cited by examiner

Primary Examiner—Reinhard J. Eisenzopf
Assistant Examiner—Lester G. Kincaid
(74) Attorney, Agent, or Firm—Scott M. Garrett

(57) ABSTRACT

A communication device (102) has a serving and neighbor list (202) and a bandmap (204, 206). Upon losing communication service (402) the device begins alternately scanning the serving and neighbor list (SNL) and subsections (302, 304, 306, 308) of the bandmap. If an appropriate carrier is found while scanning the SNL, the device reconnects to the serving system. While scanning the subsections of the bandmap, the device creates and maintains a list (312) of suitable carriers. If no carriers are found corresponding to the SNL, a serving cell is selected from the list (312).

6 Claims, 4 Drawing Sheets

METHOD FOR RECOVERING COMMUNICATION SERVICE

TECHNICAL FIELD

This invention relates in general to wireless communication services, and more particularly to restoring communication service to a communication device upon experiencing an interruption of communication service.

BACKGROUND OF THE INVENTION

Wireless communication systems are in widespread use in virtually all metropolitan areas of the world. In particular, communication systems using a geographic frequency reuse scheme, more commonly known as cellular communications systems, are the most popular. As a communication device moves from one serving cell to another, communication service hands off from one cell to the next in corresponding fashion.

One drawback with these communication systems is that communication service is sometimes lost or interrupted. Primarily this occurs when the signal from the serving cell is lost, and no other serving cells can be detected. There are a number of common scenarios where this occurs. One occurs when the communication device is camped on a serving cell, meaning no hand off to another cell is imminent, and the communication device enters an area that is shielded from serving cell's signal, such as in elevator, or upon entering a tunnel. Another scenario occurs when the communication device travels from an area covered by a serving cell into zone where there is no serving coverage, often referred to as a "dead zone."

The conventional method of restoring service involves scanning the serving cell frequency that was in use when the interruption occurred, and the frequencies of the neighbor cells of the serving cell in an attempt to locate a suitable carrier. This method is fine for minor interruptions, but it fails to account for situations where the communication device has moved to a new area during the interruption. Therefore, there is a need for a method of restoring communication service to a communication device that takes into consideration the possibility that the communication device may be in a new region when it becomes possible to restore communication service.

DETAILED DESCRIPTION OF A PREFERRED EMBODIMENT

Figure 1:
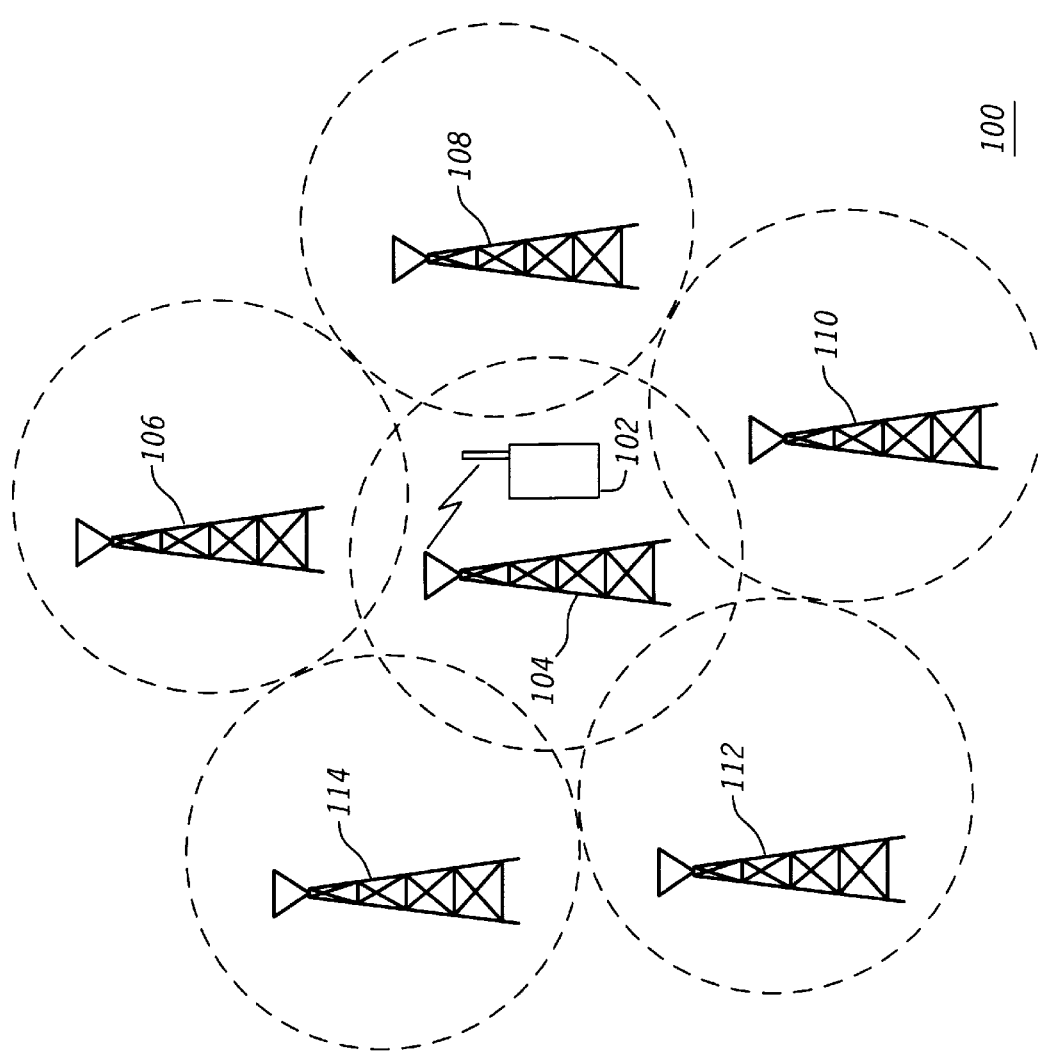
FIG. 1 is shows a cellular communication system diagram.

While the specification concludes with claims defining the features of the invention that are regarded as novel, it is believed that the invention will be better understood from a consideration of the following description in conjunction with the drawing figures, in which like reference numerals are carried forward.

The invention solves the problem of restoring communication service upon an interruption of communication service by presuming that the communication device may not be in the same region when it becomes possible to restore service. In particular, upon a loss of service, the communication device, as is conventional, begins scanning the last serving and neighbor cell list (SNL), but interleaves scanning the SNL with scanning segments or subsets of a bandmap of frequencies used in the serving region. Furthermore, the method can be enhanced by first alternating SNL scans with scans of subsets of frequencies selected from a learned bandmap, and upon exhausting the learned bandmap, a comprehensive regional bandmap.

Referring now to FIG. 1, there is shown a cellular communication system diagram 100, in which a communication device 102 is located. The communication device is presently receiving communication service from a serving cell 104, using radio frequency signals according to an air interface, as is known in the art. The serving cell has neighbor cells 106, 108, 110, 112, and 114. Upon connecting via the air interface to the serving cell 104, the communication device obtains a neighbor cell list from the serving cell, and stores a SNL in memory.

Figure 2:
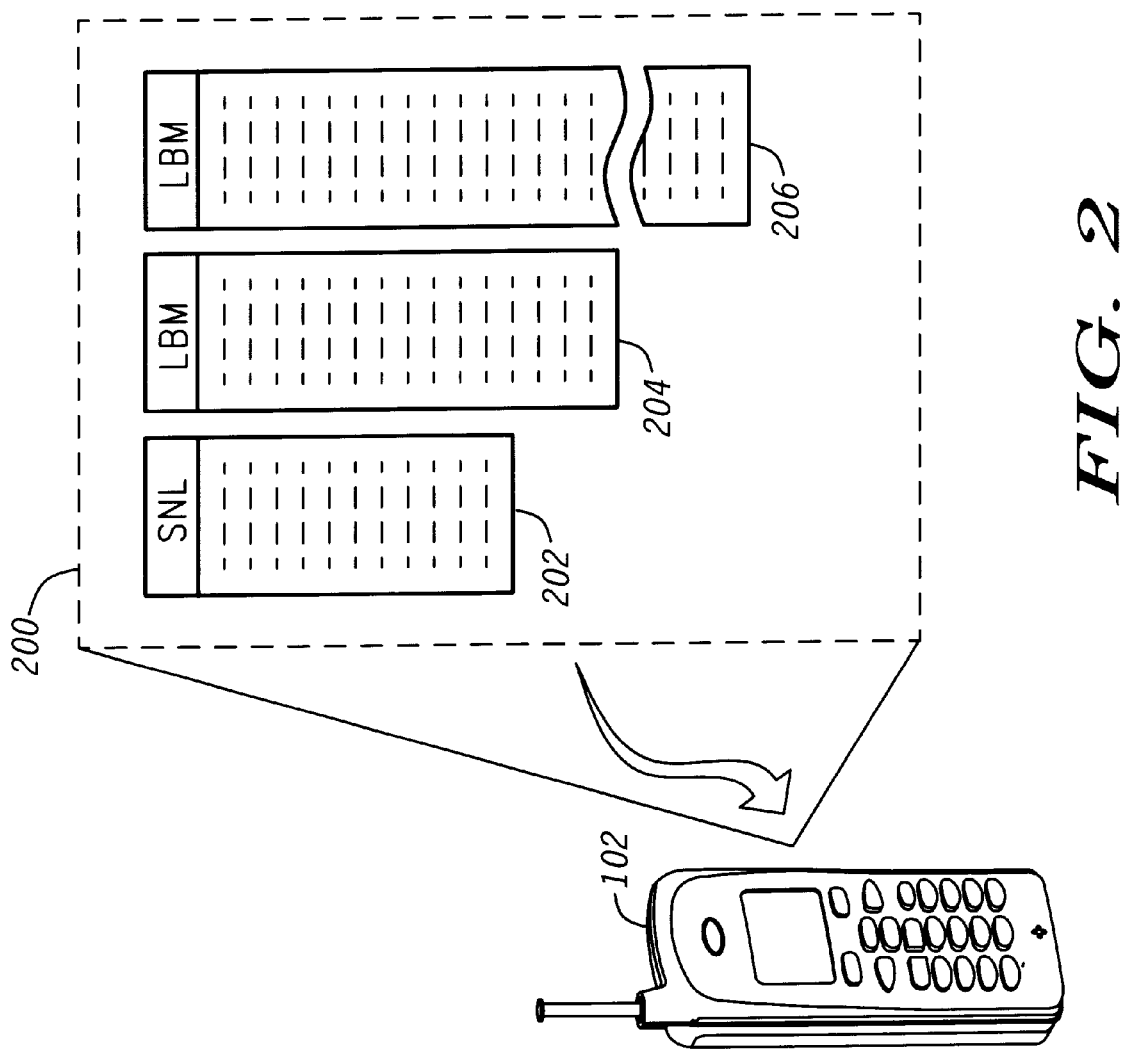
FIG. 2 shows a communication device and various frequency lists stored therein, in accordance with the invention.

Referring now to FIG. 2, there is shown the communication device 102 and various frequency lists 200 stored therein, in accordance with the invention. The SNL 202 is, as described hereinabove, a conventional SNL. In the preferred embodiment, there are at least two other lists, referred to as bandmaps, present in the communication device. One is a learned bandmap 204 and the other is a regional bandmap 206. The learned bandmap is a dynamic memory list that changes so that the most recently visited serving cell frequencies are readily available. A more complete description of the learned bandmap can be found in commonly assigned U.S. Pat. No. 5,937,351, entitled "Method for Establishing a Wireless Communications Link in a Reduced Time", the disclosure of which is hereby incorporated by reference. There, the learned bandmap is referred to as a "preferred" bandmap, and should not be confused with a preferred service provider's allotted frequencies. It is simply a listing of recently visited serving cell frequencies which is updated as the communication device travels from one serving cell to another. In most instances, when a communication device is powered up, it will be in one of the recently visited serving cells. The regional bandmap 206 is a comprehensive list of frequencies used in the region by the particular communication system. However, for the present method invention, while it is preferable to have both bandmaps, only one is necessary. If only one bandmap is used in addition to the SNL, then it is preferable to use the regional bandmap since it is comprehensive.

Figure 3:
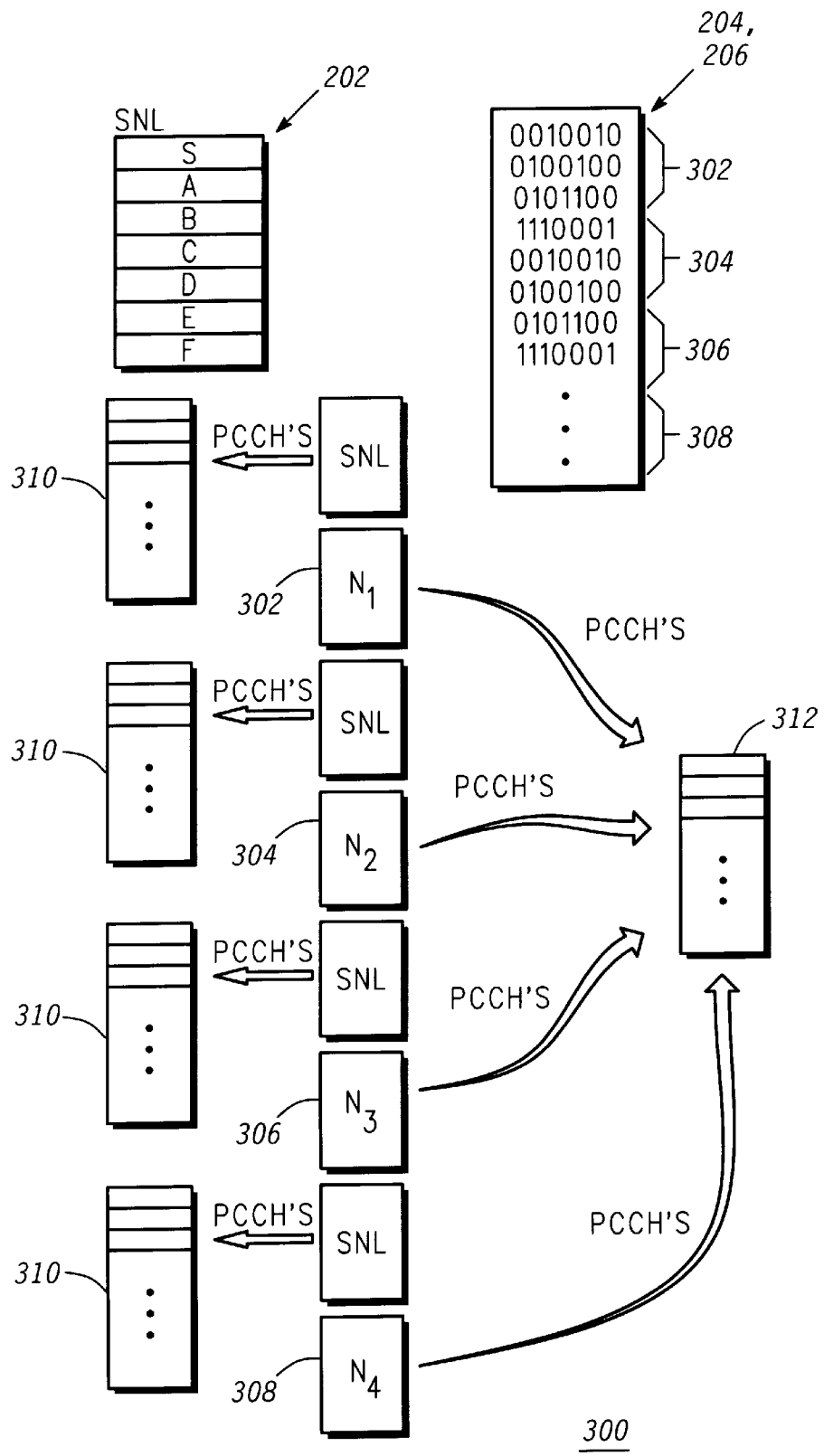
FIG. 3 shows an event diagram of a method of restoring communication service, in accordance with the invention.
Figure 4:
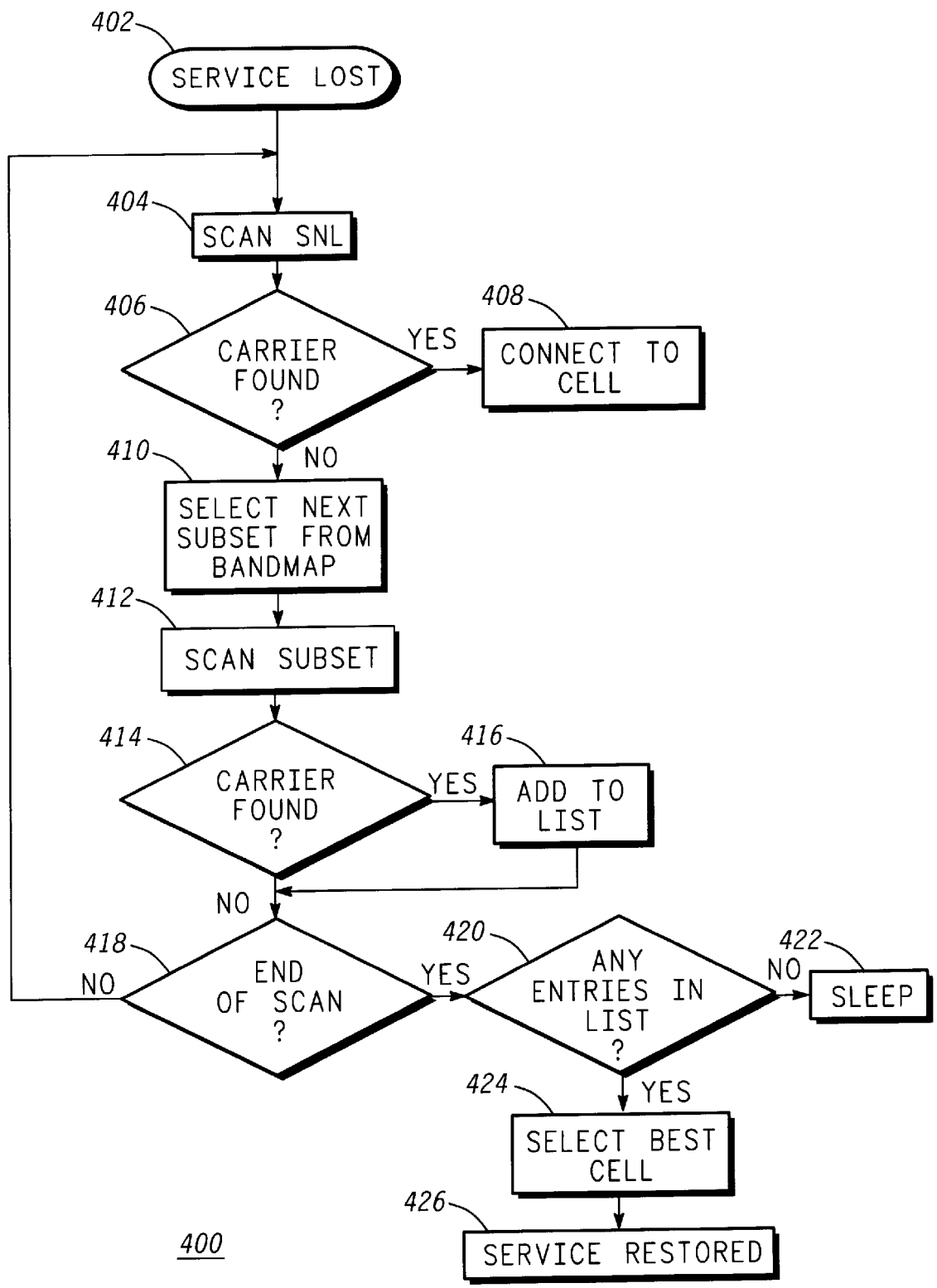
FIG. 4 shows a flow chart diagram of a method for restoring communication service, in accordance with the invention.

Referring generally to FIGS. 3 and 4, there is shown an event diagram 300 of a method of restoring communication service after a service outage, in accordance with the invention, and a flow chart diagram 400 of a method of restoring communication service. The event diagram 300 shows the SNL 202 and at least a first bandmap, such as the learned bandmap 204 or the regional bandmap 206, or both. At the start of the procedure (402) the communication service or connection to the serving cell is lost or otherwise interrupted. The method starts by scanning (404) the SNL in an attempt to detect an appropriate carrier signal having a sufficient signal quality and a sufficient signal strength. In the preferred embodiment, the communication device is scanning frequencies at which a primary control channel (PCCH) is transmitted by a cell. Thus, the device is scanning for a PCCH. While scanning the SNL, the communication device creates a first list 310 of PCCHs, if any are found. The communication device then evaluates (406) any found PCCHs to determine if any have been detected that have sufficient signal strength and signal quality. If so, the communication device connects to the cell (408) corresponding to the PCCH. If no suitable carriers are found, the communication device selects (410) a segment or subset 302 of frequencies from the bandmap 204, 206, and commences scanning (412) the subset of frequencies selected from the bandmap in an attempt to detect an appropriate carrier signal. Preferably, the device skips frequencies included in the SNL to reduce the total time taken to complete the method. While performing the subset scan, the device commences creating a secondary list 312 (414, 416) of any frequency values at which appropriate carrier signals or PCCHs were detected while scanning the subset of frequencies selected from the first bandmap. The communication device continues alternately scanning the SNL and successive subsets 304, 306, 308 having different frequencies are selected from the first bandmap while continuing to attempt to detect a suitable carrier signal (406, 414).

If at any time while scanning the SNL a suitable carrier is found, the communication device will cease the procedure and connect to the corresponding cell. In the event that both the learned bandmap and regional bandmap are employed, the learned bandmap will be used first. Once the learned bandmap has been completely scanned once, then the method continues using the regional bandmap. Once the regional bandmap is exhausted (418), the secondary list is evaluated (420) to determine if any of the carriers found suitable. If so, the device commences selecting a serving cell (424) from the list of carriers, and reconnects to the communication system, thus restoring (426) communication service. If no suitable carriers were found, then the device goes into a sleep state (422) for a preselected period of time, then repeats the method. The method may be ceased prior to exhausting all frequencies of the bandmap if a preselected number of PCCHs are found while scanning the various subsets. Finally, it is contemplated that if, while scanning one of the subsets, a suitable carrier is found, the device may cease alternately scanning the SNL and successive subsets in favor of scanning the remaining frequencies of the bandmap.

Selecting the number of frequencies in the subsets 302, 304, and so on, is a matter of engineering choice. Several factors should be considered in selecting the size, however. These include the maximum time allowable for the entire bandmap to be scanned, and the number of frequencies listed in the SNL and bandmap(s). Generally, the smaller the segments, the more times the SNL will be scanned, thus, the longer it will take to scan the bandmap once through. On the other hand, in urban environments, where interruption within cells are common, as when entering an elevator or otherwise being shielded by some structure, the more often the SNL is scanned, implying small segments, the more likely the device will reconnect in a short time, as opposed to waiting for the completion of scanning a large segment before getting back to scanning the SNL.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for recovering communication service by a communication device after an interruption of communication service to the communication device, the communication device having created a serving and neighbor cell list (SNL) prior to the interruption of communication service, the method comprising:

scanning the SNL in an attempt to detect an appropriate carrier signal having a sufficient signal quality and a sufficient signal strength;

scanning a subset of frequencies selected from a learned bandmap in an attempt to detect an appropriate carrier signal;

creating a list of any frequencies at which an appropriate carrier signal is detected while scanning the subset of frequencies selected from the first bandmap;

alternately scanning the SNL and successive subsets of frequencies selected from the first bandmap while continuing to attempt to detect a suitable carrier signal;

upon having not detected any suitable carrier signals, the method further comprising;

ceasing the scanning a subset of frequencies selected from the learned bandmap;

scanning a subset of frequencies selected from a regional bandmap in an attempt to detect an appropriate carrier signal; and creating a list of any frequencies at which an appropriate carrier signal is detected while scanning the subset of frequencies selected from the regional bandmap.

2. A method for recovering communication service by a communication device as defined in claim 1, wherein a suitable carrier signal comprises a primary control channel (PCCH).

3. A method for recovering communication service by a communication device as defined in claim 1, wherein when a suitable carrier signal is detected while scanning the SNL, the method further comprising reconnecting to a serving cell transmitting the suitable carrier signal.

4. A method for recovering communication service by a communication device as defined in claim 1, upon scanning all frequencies in the regional bandmap, the method further comprising selecting a serving cell from the list of frequencies at which an appropriate carrier signal was detected while scanning the subset of frequencies selected from the regional bandmap.

5. A method for recovering communication service by a communication device as defined in claim 1, upon scanning all frequencies in the first bandmap, the method further comprising selecting a serving cell from the list of frequencies at which an appropriate carrier signal was detected while scanning the subset of frequencies selected from the first bandmap.

6. A method for recovering communication service by a communication device as defined in claim 1, upon detecting a suitable carrier signal while scanning the subset of frequencies selected from the first bandmap, the method further comprising:

ceasing the alternately scanning the SNL and successive subsets of frequencies selected from the first bandmap;

scanning the remaining frequencies of the first bandmap in an attempt to detect a suitable carrier signal at any of the remaining frequencies;

adding any frequencies at which a suitable carrier signal is detected to the list; and upon scanning all of the remaining frequencies of the first bandmap, selecting a serving cell from the list of frequencies at which an appropriate carrier signal was detected.

* * * * *